United States Patent
Borja et al.

(10) Patent No.: US 8,807,188 B1
(45) Date of Patent: Aug. 19, 2014

(54) PROCEDURE ON BONDING USING MECHANICALLY-CONTROLLED BONDING TOOL

(71) Applicant: HGST Netherlands B.V., Amsterdam (NL)

(72) Inventors: Anabie B. Borja, Santa Rosa (PH); Ana Liza B. Hubilla, Silang (PH); Ervin R. Iporac, Santa Rosa (PH)

(73) Assignee: HGST Netherlands B.V., Amsterdam (NL)

(*) Notice: Subject to any disclaimer, the term of this patent is extended or adjusted under 35 U.S.C. 154(b) by 5 days.

(21) Appl. No.: 13/766,057

(22) Filed: Feb. 13, 2013

(51) Int. Cl.
*B29C 65/56* (2006.01)

(52) U.S. Cl.
USPC .......................... 156/556; 451/364.4; 156/566

(58) Field of Classification Search
USPC .............. 451/5, 4, 11, 12, 364, 365; 156/325, 156/327, 566, 253, 580, 578, 304.1, 556, 156/502, 49, 73.4; 29/603.07, 603.01, 29/603.12, 729, 739, 741, 742; 100/214, 100/226, 269.01
See application file for complete search history.

(56) References Cited

U.S. PATENT DOCUMENTS

| | | | |
|---|---|---|---|
| 5,406,694 A | 4/1995 | Ruiz | |
| 6,174,218 B1 * | 1/2001 | Church et al. | 451/5 |
| 7,070,671 B2 | 7/2006 | Nomura et al. | |
| 7,258,151 B2 | 8/2007 | Nomura et al. | |
| 7,866,364 B2 | 1/2011 | Chen et al. | |
| 2003/0119421 A1 * | 6/2003 | Nomura et al. | 451/5 |

OTHER PUBLICATIONS

Lee, Changwoo et al., Bonding Head Design for Thin Wafer, 11th Electronics Packaging Technology Conference, Dec. 2009, pp. 220-224, IEEE, Piscataway, United States.

* cited by examiner

*Primary Examiner* — Tom Dunn
*Assistant Examiner* — Vishal I Patel
(74) *Attorney, Agent, or Firm* — Patterson & Sheridan, LLP

(57) ABSTRACT

Embodiments herein disclose a mounting device for attaching a quad to an extender during a hard disk drive manufacturing process. Specifically, the mounting device includes a quad clamp for fastening the quad onto the surface of the mounting device and an extender clamp for fastening the extender to the mounting device. A human operator may apply an adhesive material onto a contact surface of the extender that faces the quad. Using a pressing unit, the mounting device slides the quad until the quad couples to the extender at the contact surface with the adhesive. Once the quad and extender are connected, the clamps may be disengaged so that the combined quad/extender structure may be removed from the mounting device. Using the mounting device to mechanically mount the quad onto the extender mitigates misalignment between the quad and the extender relative to a bonding process that relies on the human operator.

14 Claims, 10 Drawing Sheets

PROCEDURE ON BONDING USING MECHANICALLY-CONTROLLED BONDING TOOL

BACKGROUND OF THE INVENTION

1. Field of the Invention

Embodiments of the present invention generally relate to mounting a quad including one or more sliders onto an extender, or more specifically, attaching the quad to the extender such that misalignment is mitigated.

2. Description of the Related Art

When manufacturing a hard disk drive, a single wafer may include thousands of sliders organized in rows that extend across the wafer. At one step of the process, the wafer may be diced or sawed into a plurality of quads. Generally, a quad includes one or more rows of sliders. A typical quad may include 35 rows of sliders (i.e., 35 row bars) with a total of two thousand sliders. Because of the small dimensions of the quads (e.g., a length ranging from 4-15 cm and a width ranging from a few millimeters to 1-2 centimeters), an operator mounts the quad onto an extender using an adhesive to improve the quad's portability and durability. The extender provides mechanical support to the quad during further processing steps such as transporting the quad or performing tests on the individual sliders.

However, quads that contain small number of row bars (e.g., five row bars or less) may be mounted to extenders using a manual process that increases the risk of misalignment between quad and the extender. Specifically, the manual process may result in misalignment where the side of the quad facing the extender does not align with the contacting surface of the extender. This misalignment may negatively affect later processing steps performed on the sliders in the quad.

SUMMARY OF THE INVENTION

One embodiment disclosed herein includes a mounting device for bonding a quad comprising a plurality of sliders to an extender. The mounting device includes a quad loading surface configured to receive the quad and a quad clamp configured to couple the quad to the quad loading surface. The mounting device also includes an extender loading surface configured to receive the quad and an extender clamp configured to couple the extender to the extender loading surface. The mounting device includes a pressing unit configured to apply mechanical force to bond the quad to the extender.

Another embodiment disclosed herein includes a system comprising a mounting device for bonding a quad comprising a plurality of sliders to an extender and a control device comprising one or more switches that control the quad clamp, extender clamp. The mounting device includes a quad loading surface configured to receive the quad and a quad clamp configured to couple the quad to the quad loading surface. The mounting device also includes an extender loading surface configured to receive the quad and an extender clamp configured to couple the extender to the extender loading surface. The mounting device includes a pressing unit configured to apply mechanical force to bond the quad to the extender.

Another embodiment disclosed herein includes a method for bonding a quad to an extender. The method includes clamping a quad comprising a plurality of sliders to a mounting device and clamping an extender to the mounting device where a contact surface of the extender is aligned with a contact surface of the quad. The method includes sliding, using a mechanically controlled pressing unit of the mounting device, at least one of the quad and the extender until the contact surface of the quad interfaces with the contact surface of the extender where an adhesive bonds the quad to the extender. The method includes releasing the quad and the extender from the mounting device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments herein disclose a mounting device for attaching a quad to an extender during a hard disk drive manufacturing process. Specifically, the mounting device includes a quad clamp for fastening the quad onto the surface of the mounting device and an extender clamp for fastening the extender to the mounting device. A human operator may apply an adhesive material (e.g., epoxy) onto a contact surface of the extender that faces the quad. Using a pressing unit, the mounting device slides the quad until the quad couples to the extender at the contact surface with the adhesive. Once the quad and extender are connected, the clamps may be disengaged so that the combined quad/extender structure may be removed from the mounting device. Using the mounting device to mechanically mount the quad onto the extender mitigates misalignment between the quad and the extender relative to a bonding process that relies on the human operator to bond the quad to the extender.

An Exemplary Hard Drive

Figure 1:
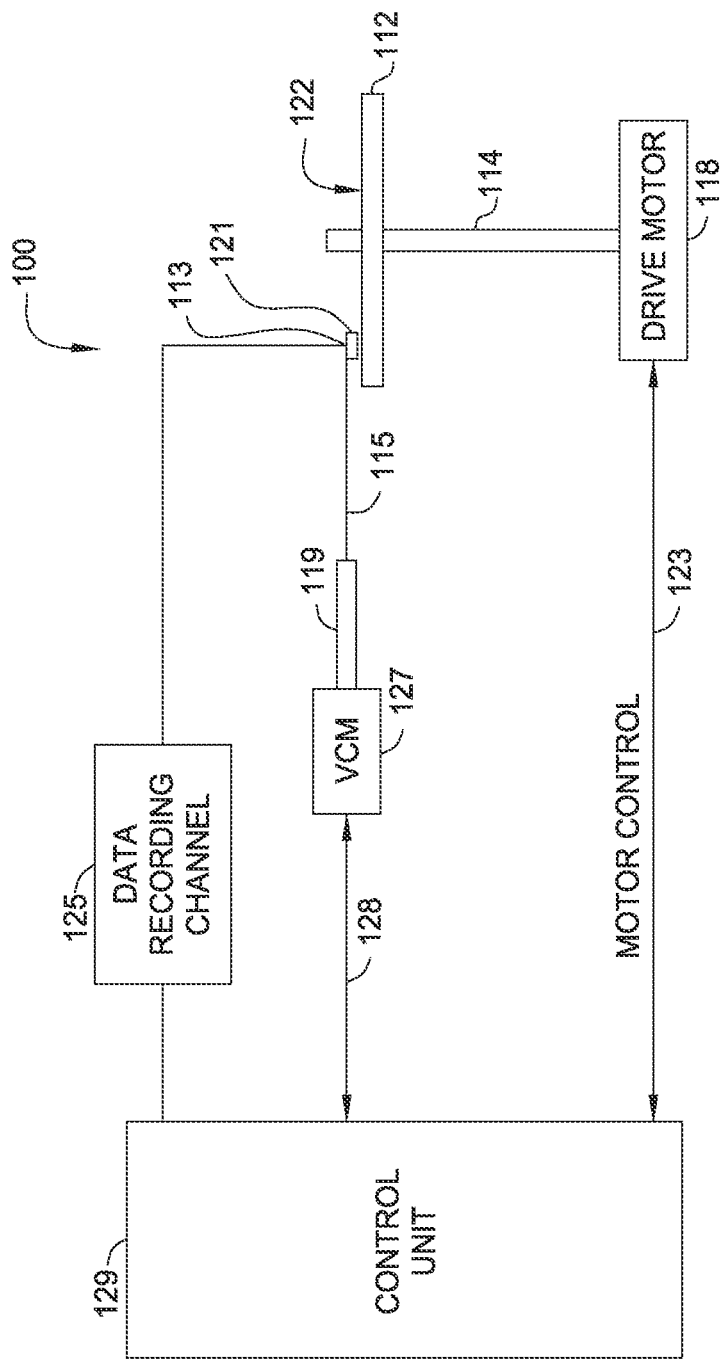
FIG. 1 illustrates a disk drive system, according to an embodiment described herein.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Mounting a Quad onto an Extender

Figure 2:
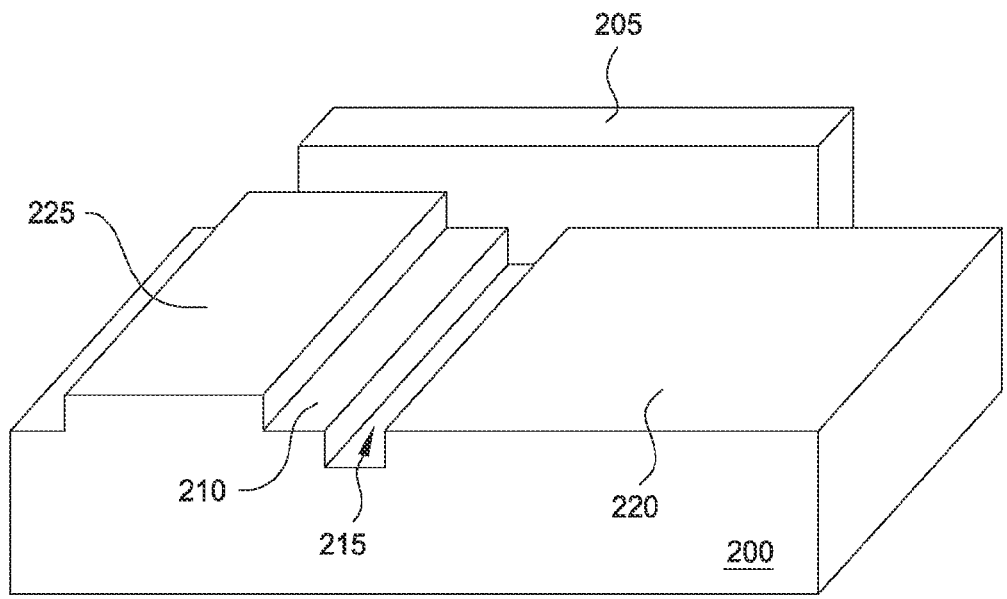
FIG. 2 is a mounting device for attaching a quad to an extender, according to an embodiment described herein.

FIG. 2 illustrates a mounting device 200 for attaching a quad to an extender, according to an embodiment described herein. In one embodiment, the mounting device 200 may be used with a quad that a small number of row bars. For example, mounting device 200 may be used only for quads that contain five or fewer row bars (also referred to as short quads). In one embodiment, a wafer, which may have approximately 500 row bars where each row bar includes around 60 sliders, is sawed into quads that each contains around 35 row bars (referred to herein as long quads). The long quads may be mounted on respective extenders for further processing, such as lapping a portion of the row bars on the long quads. These laped rows are then sliced from the long quad which may cause, however, the remaining portion of row bars (i.e., a short quad) to detach from the extender. For example, if lapping and slicing the first 30 row bars off the long quad cause the remaining 5 row bars to detach from the extender, the operator may need to reattach the unlapped row bars of the short quad to an extender. Using the mounting device 200, the operator may mount the short quad to a new extender to finish processing the sliders on the short quad (e.g., lapping the sliders).

As shown, mounting device 200 includes a quad loading surface 210 and an extender loading surface 220 with a recess 215 therebetween. The quad loading surface 210 is configured to receive a quad which is then mounted to an extender placed on the extender loading surface 220. As will be discussed in further detail later, recess 215 enables the adhesive used to attach the quad to the extender to leak out without causing the quad and the extender to misalign or the epoxy to adhere to the mounting device 200. Device 200 also includes a shared backstop 205 which, along with the quad backstop 225 holds the quad in place when attaching the quad to the extender. Moreover, the shared backstop 205 may also be used to align the quad and the extender.

Figure 3:
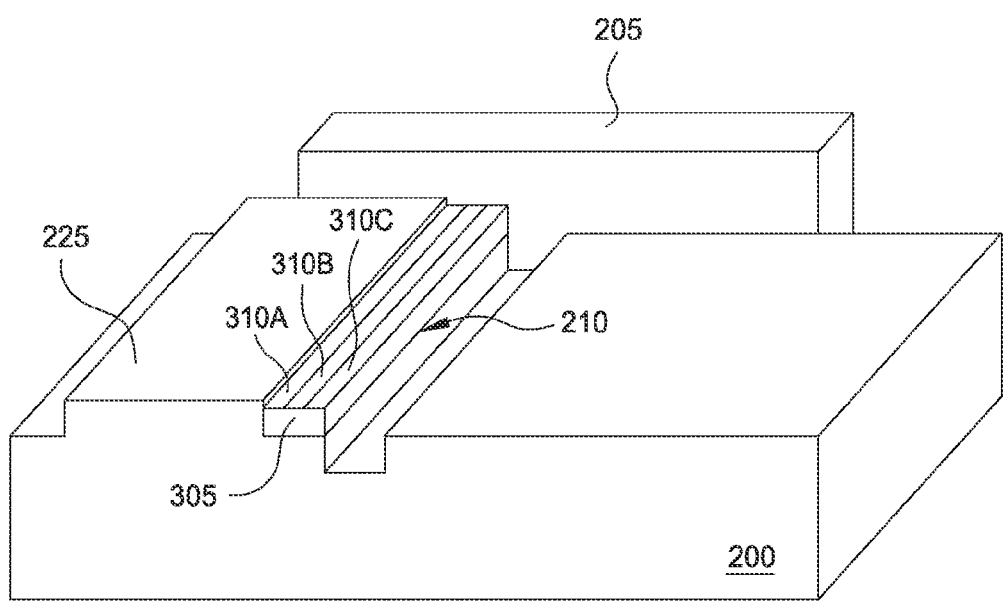
FIG. 3 illustrates placing a quad on the mounting device, according to an embodiment described herein.

FIG. 3 illustrates placing a quad 305 on the mounting device 200, according to an embodiment described herein. Specifically, an operator or technician places the quad 305 onto the quad loading surface 210. As shown here, the quad 305 includes a plurality of different row bars 310A-310C which may each include one or more sliders. Although only three are shown, the quad 305 may contain any number of row bars 310. In one embodiment, the quad 305 may include up to five row bars. Moreover, the each row bar 310 may include the same, or different, number of sliders.

In addition to placing the quad 305 onto surface 210, the operator may use an alignment tool, such as a tweezers, to ensure that respective surfaces of quad 305 contact quad backstop 225 and shared backstop 205. For example, in one embodiment, backstops 205 and 225 may intersect to form a right angle. By ensuring that the quad 305 contacts both backstops 205, 225, the operator aligns the quad 305 along the planes defined by the backstops 205, 225. However, in other embodiments, the operator may align the quad using only one of the backstops 205, 225. For example, the end of the quad 305 facing the shared backstop 205 may be curved, and thus, may not be suitable for alignment. In this example, only the quad backstop 225 is used to align the quad 305.

Figure 4:
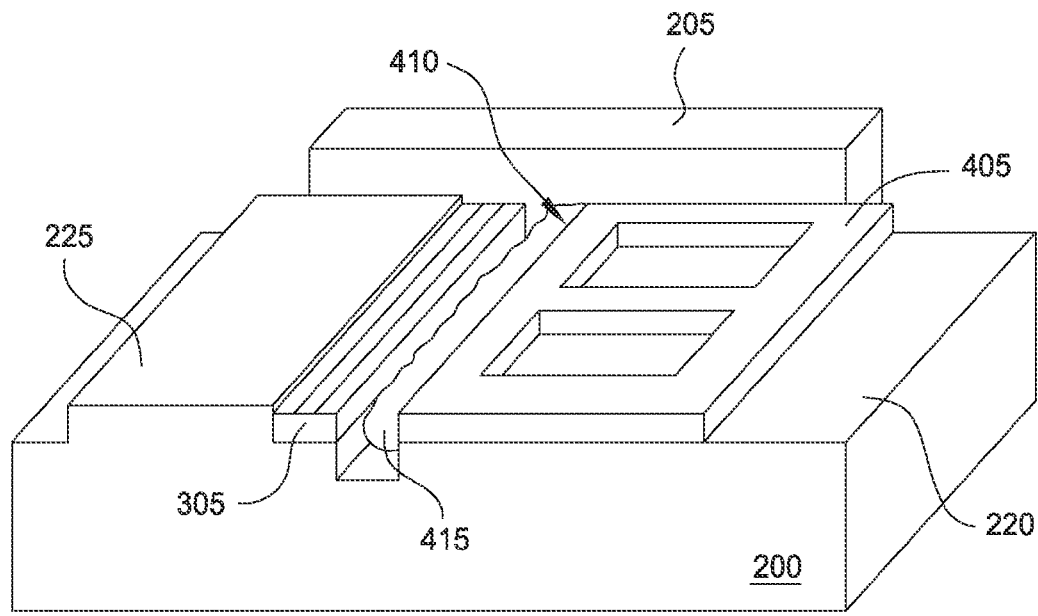
FIG. 4 illustrates placing an extender on the mounting device, according to an embodiment described herein.

FIG. 4 illustrates placing the extender 405 on the mounting device 200, according to an embodiment described herein. As shown, the operator places extender 405 onto the extender loading surface 220. The extender 405 is not limited to any particular type of material and may be made of, for example, a polymer, plastic, metal, or other rigid material. Moreover, before placing the extender onto the surface 220 or while the extender 405 is on the surface 220, the operator may apply the adhesive 415 to the contact surface 410—i.e., the surface of the extender facing the quad 305. In one embodiment, the adhesive 410 may be an epoxy or other viscous or solid material capable of attaching the quad 305 to the contact surface 410 of the extender 405. After placing the extender 405 onto the mounting device 200, the operator may align the extender 405 by ensuring the extender 405 contacts the shared backstop 205.

Figure 5A:
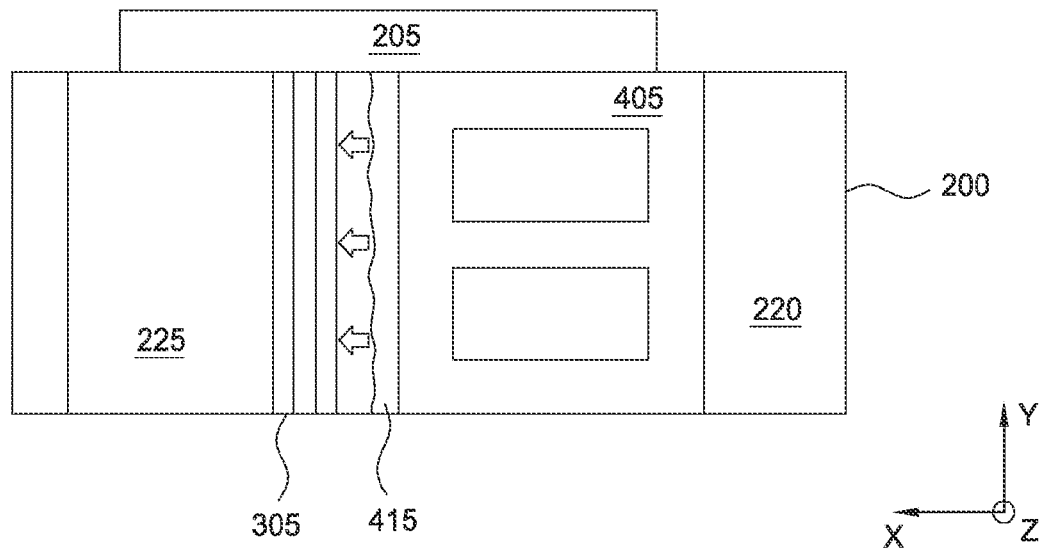
FIGS. 5A-5B are top views of mounting the quad to the extender, according to embodiments described herein.
Figure 5B:
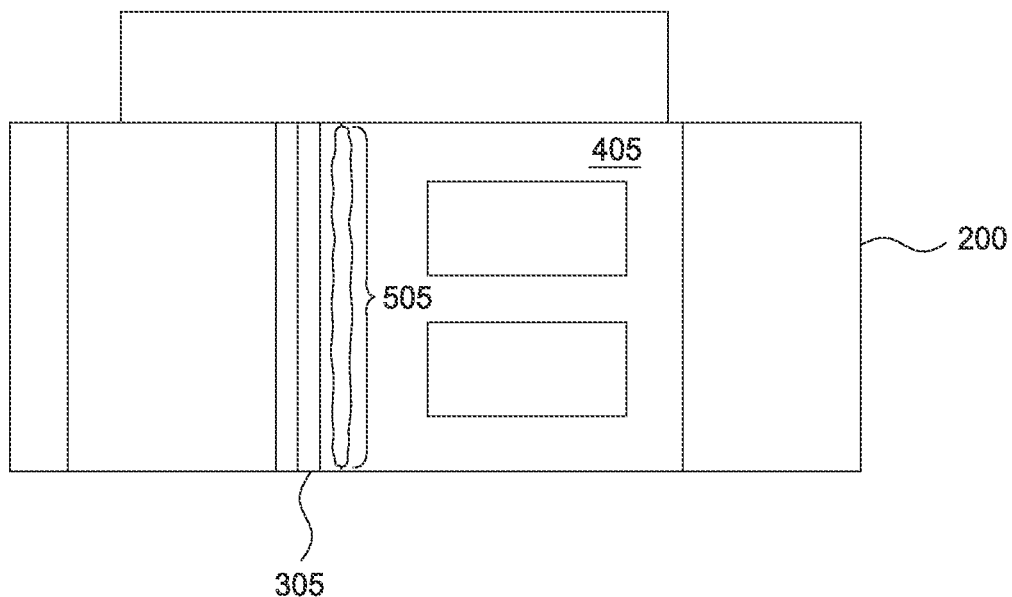

FIGS. 5A-5B are top views of mounting quad 305 to extender 405, according to embodiments described herein. As shown by the arrows in FIG. 5A, the operator provides a force to slide the extender 405 in the direction of the quad 305. In this example, the quad loading surface (not shown) and the extender loading surface 220 may be on the same plane so as to align the quad 305 and the extender 405 in the "z" direction (i.e., the direction into and out of the page). By maintaining contact between the extender 405 and the shared backstop 205 as shown, the operator ensures that the extender 405 is aligned with the quad 305 as the extender 405 moves towards the quad 305. That is, because quad 305 may have been previously aligned to the shared backstop 205 and/or the quad backstop 225, shared backstop 205 serves as a guide to maintain this alignment in the "x" and "y" directions as the operator moves extender 405 towards quad 305.

FIG. 5B illustrates attaching quad 305 to extender 405 by pressing the contact surface of the extender 405 against the side of quad 305 facing the extender 305. This force may cause extra adhesive 505 to move from the contact surface of extender 405 to a top side of extender 405 and/or quad 305. In one embodiment, the excess adhesive 505 may be undesirable. The operator may remove the excess adhesive 505 by wiping in a direction towards the extender 405 to keep the epoxy from affecting the sliders in quad 305. Although not shown, extra adhesive may also have moved from the contact surface to an underside of extender 405 or quad 305. Because mounting device 200 includes a recess where the quad 305 and extender 405 contact, the extra adhesive is able to move from the contact surface without misaligning the quad 305 and the extender 405. The operator may similarly remove the excess adhesive from the underside of the extender 405 or quad 305.

Figure 6:
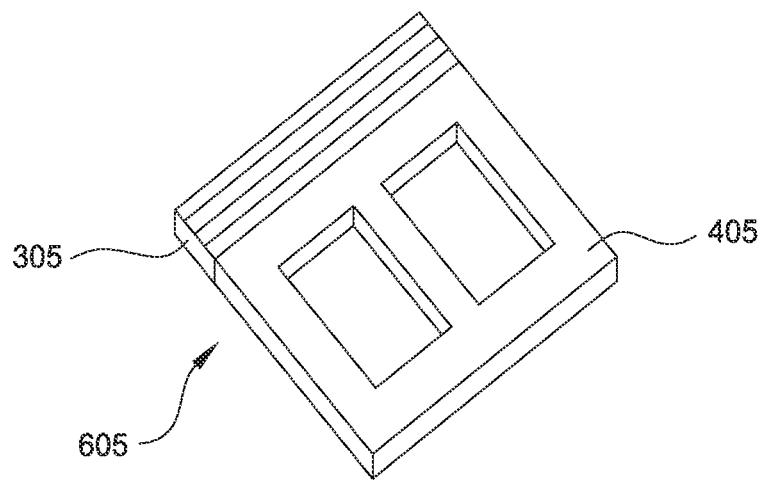
FIG. 6 illustrates an ideal coupling of the quad and the extender, according to an embodiment described herein.

FIG. 6 illustrates an ideal coupling of the quad and the extender, according to an embodiment described herein. Preferably, after attaching quad 305 to extender 405, the quad 305 and the extender 405 align at the contact interface 605. Stated differently, the plane defined by the surface of the quad 305 facing the extender 405 is parallel with the plane defined by the contact surface of extender 405. Although not shown, the contact interface 605 will include a thin layer of the adhesive which may be cured to firmly attach the quad 305 to extender 405. In this manner, extender 405 may be used to transport quad 305 as well as provide additional mechanical support to the quad 305 during further processing steps such as, for example, wire bonding to individual sliders or groups of sliders in the row bars.

Figure 7:
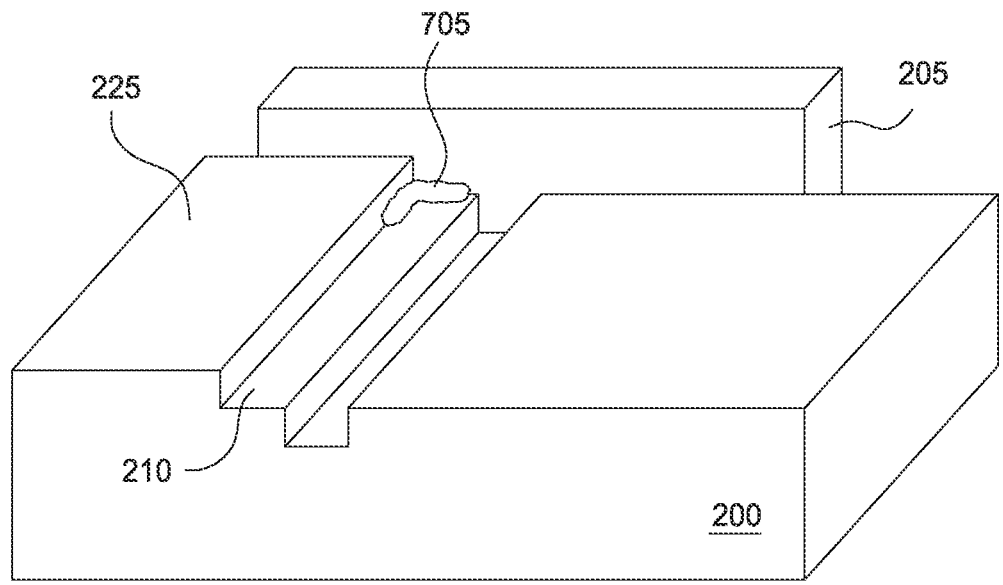
FIG. 7 illustrates residue adhesive on the mounting device, according to an embodiment described herein.

FIG. 7 illustrates residue adhesive on the mounting device 200, according to an embodiment described herein. After a quad is mounted on an extender and subsequently removed from the mounting device 200, the operator may clean the surfaces of the mounting device 200. However, due to human error or the design of the mounting device 200, leftover adhesive 705 may accumulate. Specifically, because the quad loading surface 210 contacts the shared backstop 205, it may be difficult for the operator to clean out the leftover adhesive 705 at corner between the quad loading surface 210 and the backstop 205. Moreover, after repeated usage, the leftover adhesive 705 may also migrate to the corner between surface 210 and the quad backstop 225. Once hardened, a quad placed over the leftover adhesive 705 does not lie flush with the quad loading surface 210. Moreover, the quad may also be unable to lie flush with either the shared backstop 205 or the quad backstop 225 which may further misalign the quad.

Figure 8A:
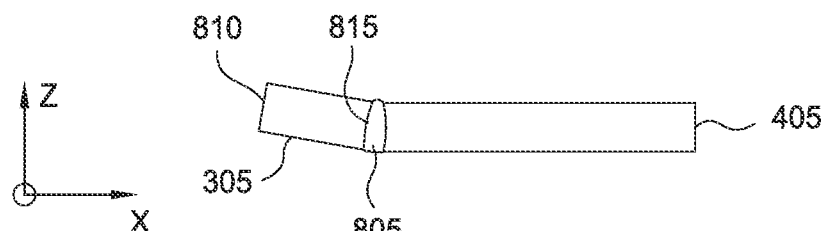
FIGS. 8A-8B illustrate misalignment between the quad and the extender, according to embodiments described herein.
Figure 8B:
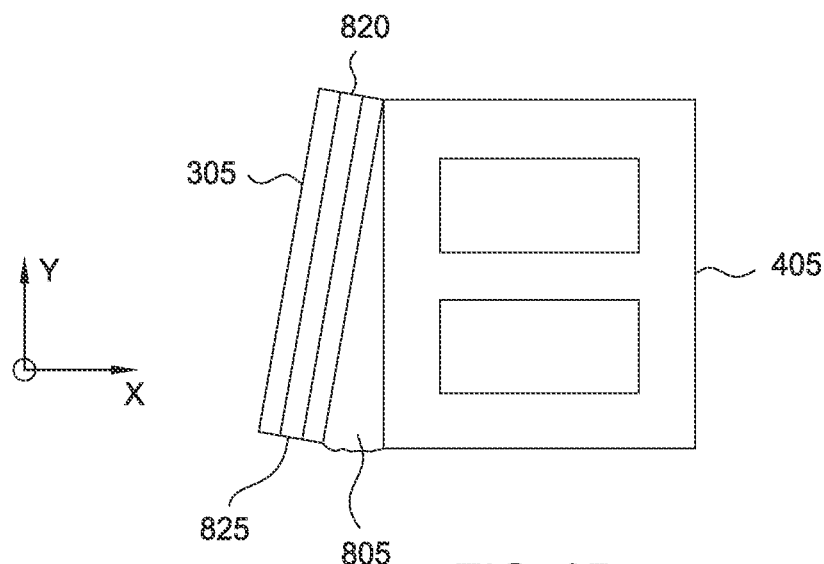

FIGS. 8A-8B illustrate misalignment between the quad and the extender, according to embodiments described herein. Specifically, FIG. 8A illustrates a side view of the resulting misalignment that may occur from the leftover adhesive shown in FIG. 7. Here, the adhesive may cause quad 305 to tilt (i.e., misalign in the z direction) relative to extender 405. For example, the adhesive may raise side 810 of the quad 305 relative to side 815. When the operator presses the extender 405 onto the quad 305, the adhesive 805 between the quad 305 and the extender 405 does not form a layer with uniform thickness, thereby causing the misalignment.

FIG. 8B illustrates a top view of resulting misalignment that may occur from the leftover adhesive shown in FIG. 7. Here, the leftover adhesive may cause side 820 to be closer to extender 405 than side 825. Accordingly, when the quad 305 and the extender 405 are pressed together, the contact surfaces misalign in the x and y directions. Further, the misalignment shown in FIGS. 8A-8B may be caused by other factors besides the leftover adhesive shown in FIG. 7. For example, because the mounting device 200 relies on an operator to press the quad 305 and the extender 405 together, the operator may use a too much (or too little) force, or apply the force unevenly. For example, too much force may cause quad 305 and extender 405 to buckle while uneven force may cause the adhesive 805 to have varied thicknesses along the contact surface. Thus, human error may also cause the misalignment shown. The misalignment orientations shown in FIGS. 8A-8B are only examples of different misalignment scenarios which may occur and are not intended to represent all the possible ways the quad 305 and extender 405 may misalign.

Figure 9:
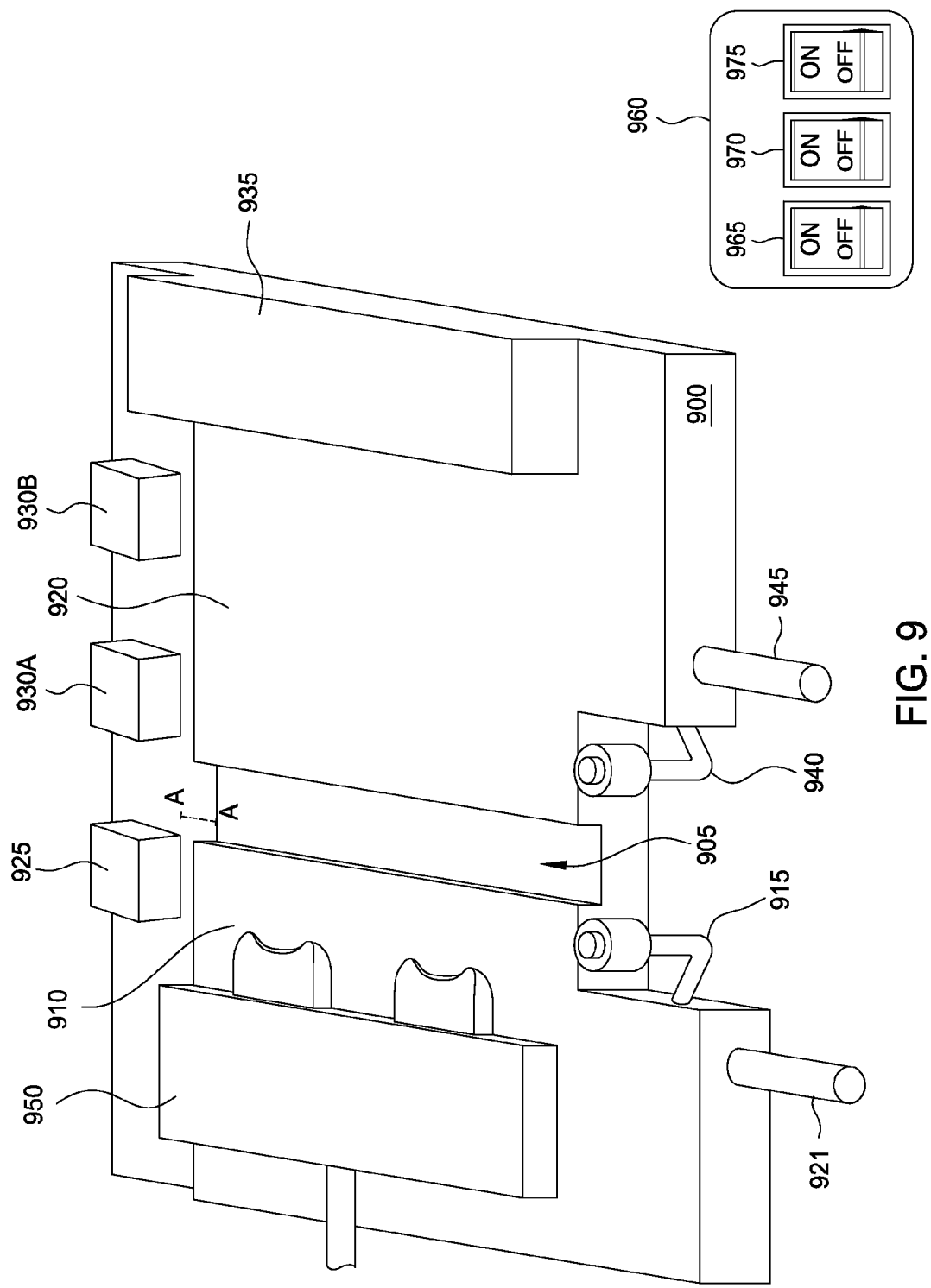
FIG. 9 illustrates a mounting device for attaching a quad to an extender, according to an embodiment described herein.

FIG. 9 illustrates a mounting device 900 for attaching a quad to an extender, according to an embodiment described herein. Like the mounting device described in FIG. 2, mounting device 900 includes a quad loading surface 910 and an extender loading surface 920. To align the quad on surface 910, mounting device 900 includes a quad stop 925 and a quad clamp 915 which is controlled by actuator 921. Moreover, quad stop 925 is separated from the quad loading surface 910 by distance A-A (approximately 5-20 mm). Providing this spacing reduces the likelihood that improper cleaning will result in leftover adhesive causing the quad the extender to become misaligned. Moreover, mounting device 900 includes recess 905 which may perform a similar function as recess 215 of FIG. 2 for enabling excess adhesive to move to the underside of the extender or quad without causing misalignment.

Mounting device 900 includes extender stops 930A and 930B as well as an extender backstop 935. Using an extender clamp 940 controlled by actuator 945, mounting device 900 may align the extender on the extender loading surface 920. As shown, the extender stops 930 are also spaced a distance A-A from the extender loading surface 920, however, this configuration is optional. That is, if surface 920 does not need to be cleaned to remove leftover adhesive, the extender stops may directly contact the surface 920 without the possibility of leftover adhesive causing the extender to misalign relative to the quad.

Mounting device 900 also includes a pressing unit 950 which slides laterally to attach the quad to the extender. That is, in contrast to mounting device 200 in FIG. 2 which relies on the operator to manually press the extender against the quad, mounting device 900 uses the pressing unit 950 to mechanically attach the quad to the extender. Moreover, instead of sliding the extender towards the quad, pressing unit 950 slides the quad towards the extender while the extender remains fixed against the extender backstop 935 and/or extender stops 930A and 930B.

Mounting device 900 may be communicatively coupled to a control device 960 which includes one or more switches that may be used to control quad clamp 915, extender clamp 940, and pressing unit 950. For example, switch 965 may control actuator 921 that causes clamp 915 to apply pressure to a quad placed on surface 910, switch 970 may control actuator 945 that causes clamp 940 to apply pressure to an extender placed on surface 920, and switch 975 may control actuator 1220 which causes pressing unit 950 to slide laterally. Although three switches are shown, control device 960 may include any number of switches or use any type of switch (e.g., a button, lever, dial, etc.) for controlling the mechanical motion of the elements in the mounting device 900. Moreover, the control device 960 may be communicatively coupled to the mechanical system or systems (not shown) that control the actuator 921, extender clamp 940, and pressing unit 950 using any type of wired or wireless communication technique.

Figure 10:
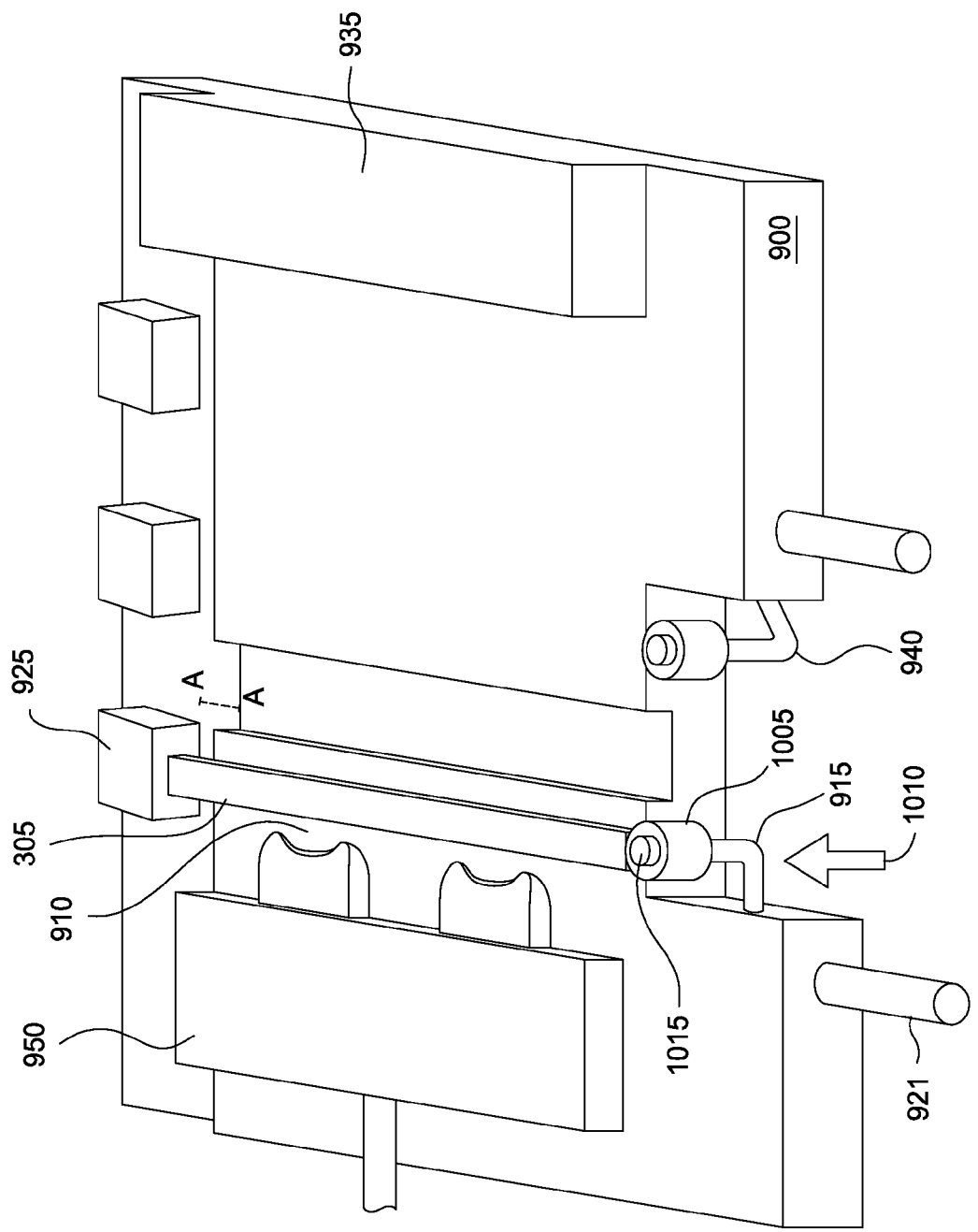
FIG. 10 illustrates clamping a quad to the mounting device, according to an embodiment described herein.

FIG. 10 illustrates clamping a quad to mounting device 900, according to an embodiment described herein. Specifically, FIG. 10 illustrates an operator placing quad 305 on the quad loading surface 910. The operator may further align the quad by ensuring a first end of the quad 305 is flush with the quad stop 925. Notably, when placing quad 305 on the mounting device 900, quad clamp 915 is an open position as shown in FIG. 9. However, after aligning quad 305 on the surface 910, the operator may activate a switch in the control device (not shown) which causes the quad clamp 915 to move in the direction shown by arrow 1010. Eventually, a contact element 1005 of the clamp 915 contacts a second end of the quad 305 and presses the quad 305 against the quad stop 925, thereby holding the quad 305 firmly in place. In one embodiment, while the mounting device clamps quad 305 into place, the operator may continue to hold the quad 305 using an aligning tool (e.g., tweezers) which may reduce the likelihood that the clamping action shown by arrow 1010 will damage the fragile quad 305. Further, when clamping quad 305 to the device 900, the quad 305 may not directly contact the pressing unit 950. For example, clamp 915 may be configured to hold the quad 305 a few millimeters away from the pressing unit 950.

In one embodiment, the contact element 1005 may comprise an elastic material, such as rubber, that is formed into a cylinder. As shown in FIG. 10, the contact element 1005 is fitted over a support portion 1015 of clamp 915. Further still, the materials of the contact element 1005 and the support portion 1015 may be chosen such that the contact element is rotatable around the support portion 1015. As will be discussed in greater detail below, this characteristic may permit the quad 305 to move laterally (i.e., in a direction perpendicular to the arrow 1010) while maintaining the pressure that clamps the quad 305 to the quad stop 925.

Figure 11:
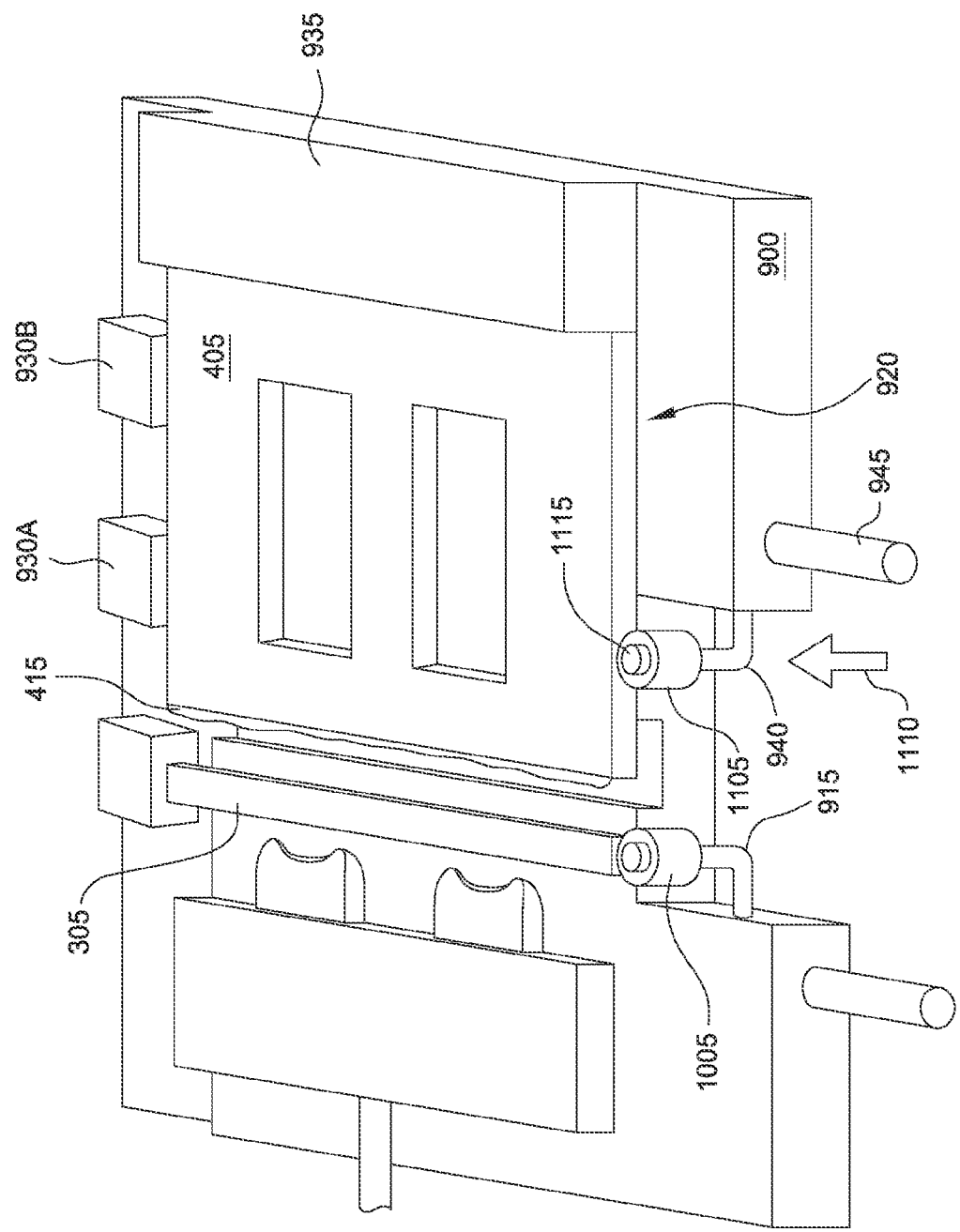
FIG. 11 illustrates clamping an extender to the mounting device, according to an embodiment described herein.

FIG. 11 illustrates clamping the extender 405 to the mounting device 900, according to an embodiment described herein. In one embodiment, the operator may place the extender 405 onto the extender loading surface 920. Using a switch of the control device, the operator may instruct the actuator 945 to move the quad clamp 940 to press the extender 940 against the extender stops 930A and 930B. This clamping action is illustrated by arrow 1110. Moreover, when placing the extender 405 onto the surface 920, the operator may align the extender 405 such that its back surface contacts the backstop 935.

In one embodiment, the extender clamp 940 may include a contact element 1105 that is placed over the support portion 1115 like the quad clamp 915. However, unlike contact element 1005, contact element 1105 may not be rotatable around the support portion 1115 if the extender 405 does not need to move laterally during the bonding process. Nonetheless, in both configurations actuator 945 and clamp 940 are used to align and stabilize extender 405 during the quad bonding process.

The operator may apply adhesive material 415 to a side of the extender 405 facing the quad 305. As discussed previously, the adhesive material 415 is used to secure the quad 305 onto the extender 405. The operator may apply the adhesive 415 onto the contact surface of the extender 405 either before or after the extender 405 is placed onto the surface 920.

Figure 12:
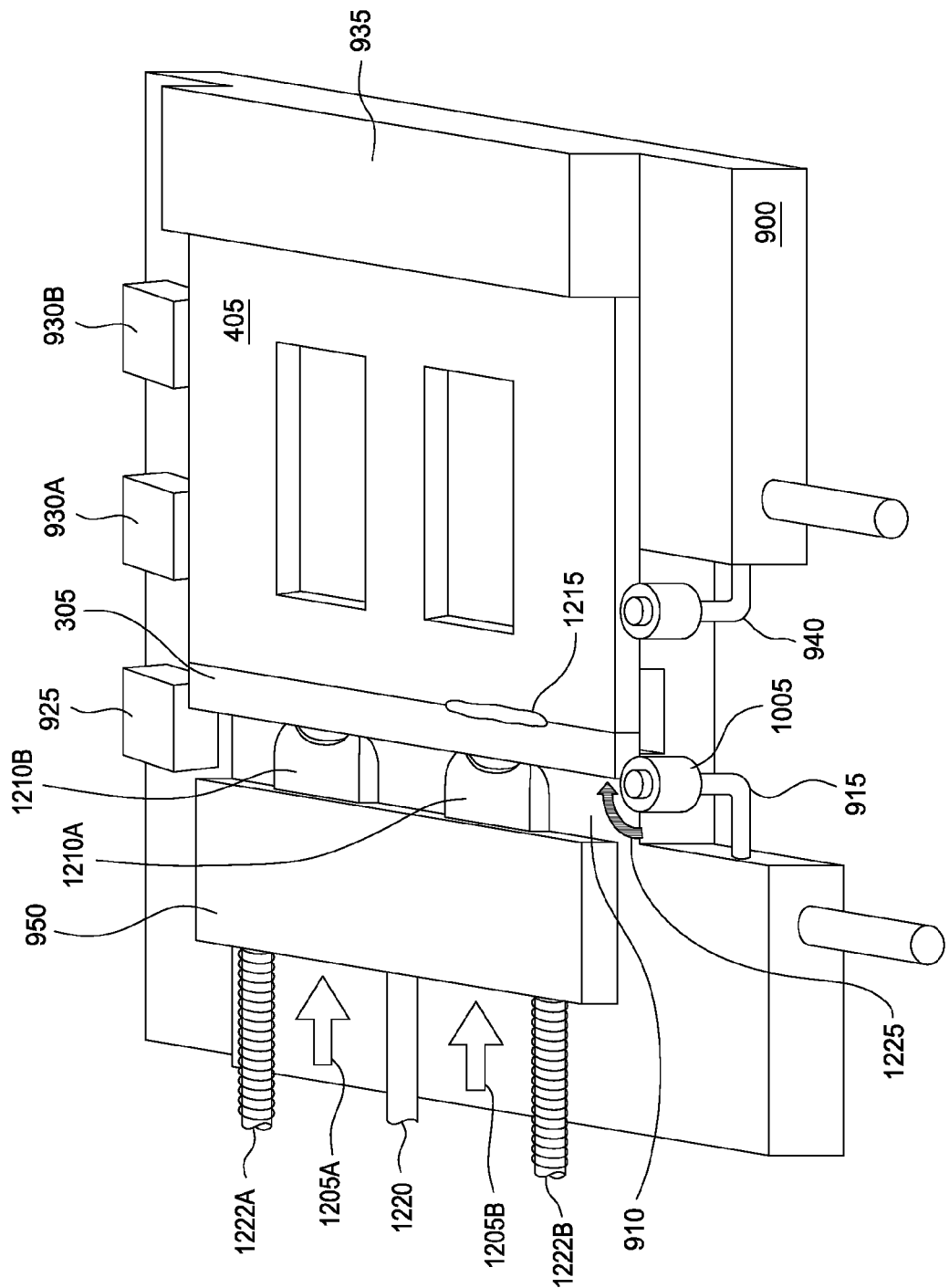
FIG. 12 illustrates attaching the quad to the extender, according to an embodiment described herein.

FIG. 12 illustrates attaching the quad 305 to the extender 405, according to an embodiment described herein. As shown, the quad 305 is coupled to extender 405 using the pressing unit 950. Specifically, the pressing unit 950 includes two appendages 1210A and 1210B that include one or more contact points that slide the quad 305 until the quad 305 presses against the extender 405. These horn shaped contact points (also called seesaws) minimize the surface area of the pressing unit 950 contacting the quad 305 which may reduce the risk of damaging the quad 305.

Once the quad 305 and extender 405 are in place, the operator may activate a mechanical system via the control device which moves the rod 1220 and processing unit 950 laterally along the quad loading surface 910. In one embodiment, the mounting device may also include spring slide shafts 1222A and 1222B that use spring tension to move the pressing unit 950 laterally when released or pushed by the actuator 1220. In one embodiment, the pressing unit 950 may slide several millimeters before contacting the quad 305. The pressing unit 950 slowly presses the quad 305 until the quad 305 contacts the extender 405 so that the adhesive may bond the two elements together as shown by the arrows 1205A and 1205B. In one embodiment, the contact element 1005 of the quad clamp 915 rotates as shown by arrow 1225 as the pressing unit 950 applies force against the quad 305. Doing so may aid the quad 305 to slide while still be held against the quad stop 925. Stated differently, the end of the quad 305 contacting the clamp 915 may roll using the contact element 1005 while the opposite end of the quad 305 slides along the quad stop 925. Nonetheless, both ends of the quad 305 remain in contact with the respective elements of the mounting device 900. In this manner, the quad 305 may remain aligned to the contact surface of the extender 405 while being pushed by the pressing unit 950.

Eventually, the force applied by the appendages 1210A and 1210B presses the quad 305 to the extender 405 as shown. Because extender 405 is held in place by extender stops 930, clamp 940, and backstop 935, the force applied by the pressing unit 950 fixes the quad 305 to the extender 405. In one embodiment, the pressing unit 950 may continue to apply this pressure for a predetermined amount of time to permit at least a portion of the adhesive to cure. After mounting the quad 305 to the extender 405, the mechanical system controlling the pressing unit 950 slides the unit 950 in a direction opposite of the direction shown by the arrows 1205A and 1205B. Moreover, the operator may instruct the mechanical systems controlling the quad clamp 915 and extender clamp 940 to also release the quad 305 and the extender 405. The operator is then free to remove the combined quad/extender structure from the mounting device 900.

As discussed herein, the clamps 915 and 940 and the pressing unit 950 may be controlled by any type of mechanical system capable of applying a force to the quad and extender. For example, the mechanical systems may use pneumatic, hydraulic, spring tension, or any other mechanical (non-human) technique for applying a force. Moreover, the mechanical system or systems may be adjustable by the operator to cause motion at a specific rate with a desired force. For example, the operator may specify that the quad clamp 915 or pressing unit 950 move at a slow rate with a maximum force that will not, for example, damage the fragile quad 305 when pressing the quad 305 against the quad stop 925 or sliding the quad 305 towards the extender 405.

Like in the manual mounting process, using the mounting device 900 may result in leftover adhesive 1215 at the contact surface. Although not shown, the leftover adhesive may also be found on the underside surface of the quad 305 or extender 405. Either before or after the combined structure is released from the mounting device 900, the operator may remove the leftover adhesive 1215. Moreover, after removing the quad 305 and extender 405, the operator may clean the quad and extender loading surfaces of the mounting device 900. However, because the quad stop 925 is separated from the quad loading surface 910 by the distance A-A as shown in FIG. 9, the mounting device 900 is able to avoid the alignment issues associated with leftover adhesive remaining on the quad loading surface. That is, the recess between the quad loading surface and the quad stop 925 enables the operator to easily access the entire area of the quad loading surface without the quad stop 925 impeding access to some portions of the surface. Moreover, by using the mechanically controlled pressing unit 950 to attach the quad 305 to the extender 405 rather than the force applied by the human operator, the force is applied evenly by the appendages 1210A-1210B which may further avoid misaligning the quad 305 and extender 405.

Figure 13:
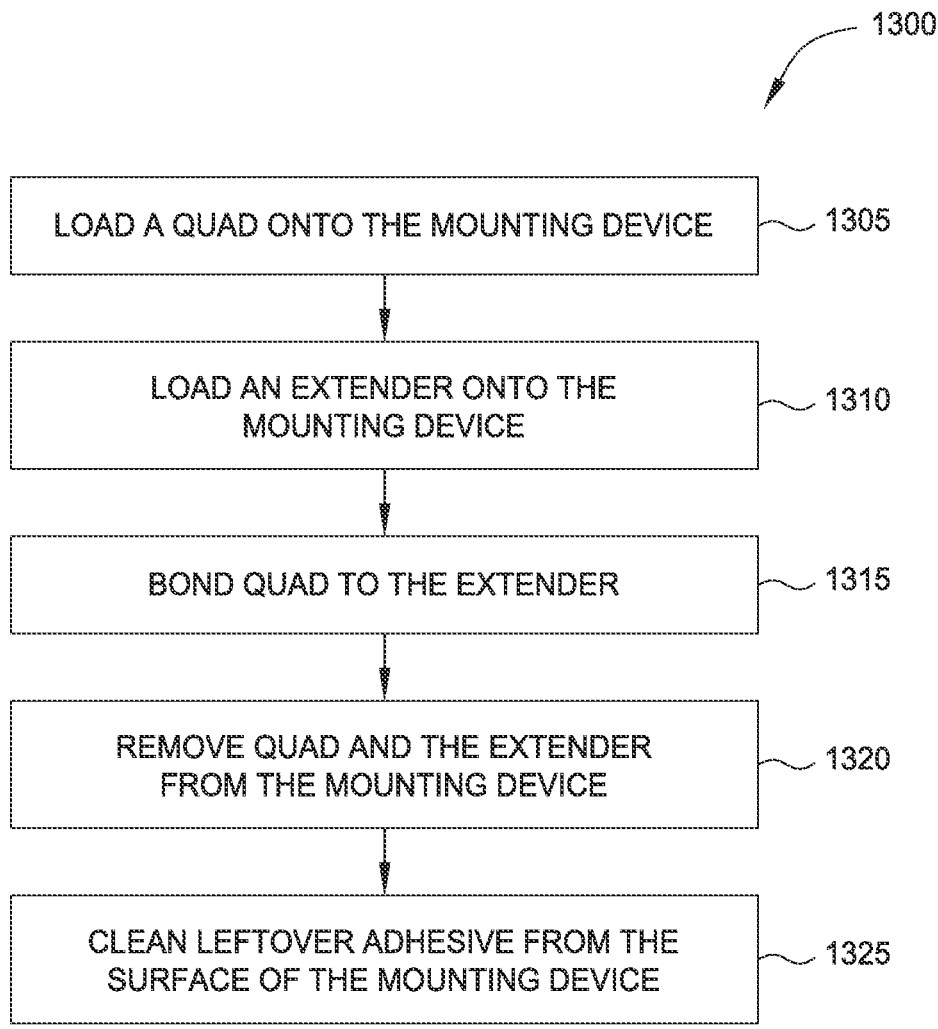
FIG. 13 is a flowchart showing a method for attaching a quad to an extender, according to an embodiment described herein.

FIG. 13 is a flowchart 1300 illustrating a method for attaching a quad to an extender, according to an embodiment described herein. At block 1305, an operator may load a quad onto a mounting device. The operator may use an alignment element, such as the quad stop 925 shown in FIG. 9, to align the quad onto the mounting device. After placing the quad on the mounting device, the operator may use a first switch on a control device to activate a mechanical clamp that firmly holds the quad onto the mounting device. For example, the switch may activate a pneumatic clamp that applies a constant pressure against the quad, which, in combination with the alignment element, may affix the quad to the mounting device.

At block 1310, the operator may load an extender onto the mounting device such that a contact surface of the extender aligns with a surface of the quad. Either before or after the extender is placed on the mounting device, the operator may apply an adhesive to the contact surface for bonding the quad to the extender. The mounting device may include other alignment elements, such as the extender stops 930 and backstop 935 shown in FIG. 9, the operator may use to align the contact surface of the extender to the quad. Using a second switch on the control device, the operator may cause a second mechanical clamp to firmly hold the extender against the alignment elements. In one embodiment, the alignment elements may be configured to align the extender such that it is separated from the quad by a predefined distance—e.g., a few millimeters.

At block 1315, the quad is bonded or mounted onto the extender. Using a third switch on the control device, the operator may activate a pressing unit that slides the quad until it contacts the surface of the quad with the adhesive. In one embodiment, the quad may remain clamped to the mounting device as the pressing unit slides the quad towards the extender. For example, as discussed above, the quad clamp may include a contact element that rotates in a direction towards the extender. Alternatively, the surface of the clamp contacting the quad may be configured to allow the quad to slide while still maintaining the force required to maintain the quad's alignment. For example, the contact surface of the clamp may be flat like the surface of the quad stop 925 shown in FIG. 12 and made out of a material that permits the quad to slide towards the extender.

In one embodiment, the pressing unit may slide the extender towards the quad instead of sliding the quad towards the stationary extender. Here, the mounting device may include a backstop associated with the quad that permits the pressing unit to slide the extender until the extender contacts a surface of the quad. For example, the clamp that affixes the extender to the mounting device may be rotatable to better facilitate the ability of the extender to slide along a surface of the mounting device. Further still, in another embodiment, the mounting device may include two pressing units (or a pressing unit with two portions) where one of the pressing unit slides the quad towards the extender and the other pressing unit slides the extender towards the quad until the two elements contact.

At block 1320, the operator may deactivate the switches and remove the quad and the extender from the mounting device. In one embodiment, however, the operator may wait for a predetermined time before releasing the clamps and pressing unit from holding the quad and the extender to the mounting device (and each other). Doing so may provide time for the adhesive bonding the quad to the extender to cure. In one embodiment, the control device may include logic circuitry that automatically releases the quad and extender from the mounting device after the predetermined time has elapsed. Once the clamps and pressing unit are no longer holding the quad and extender to the mounting device, the operator may remove the combined quad/extender structure.

At block 1325, the operator may clean leftover adhesive from the surface of the mounting device. In one embodiment, the mounting device is configured to enable easy cleaning by the operator. Specifically, the mounting device may avoid having any corners that may collect adhesive leftover from bonding the quad to the extender. For example, the mounting device may be arranged as shown in FIG. 9 where the quad loading surface 910 is separated from the quad stop 925.

In one embodiment, the operator may remove some of the leftover adhesive while the quad and extender remain clamped to the mounting device. For example, the operator may remove any of the leftover adhesive from the upper side of the extender or quad before releasing the combined structure from the mounting device.

CONCLUSION

Embodiments herein disclose a mounting device for attaching a quad to an extender during a hard disk drive manufacturing process. Specifically, the mounting device includes a quad clamp for fastening the quad onto the surface of the mounting device and an extender clamp for fastening the extender to the mounting device. A human operator may apply an adhesive material onto a contact surface of the extender that faces the quad. Using a pressing unit, the mounting device slides the quad until the quad couples to the extender at the contact surface with the adhesive. Once the quad and extender are connected, the clamps may be disengaged so that the combined quad/extender structure may be removed from the mounting device. Using the mounting device to mechanically mount the quad onto the extender mitigates misalignment between the quad and the extender relative to a bonding process that relies on the human operator to bond the quad to the extender While the foregoing is directed to embodiments of the present invention, other and further embodiments of the invention may be devised without departing from the basic scope thereof, and the scope thereof is determined by the claims that follow.

What is claimed is:

1. A mounting device for bonding a quad comprising a plurality of sliders to an extender, the mounting device comprising:
    a quad loading surface configured to receive the quad;
    a quad clamp configured to couple the quad to the quad loading surface;
    an extender loading surface configured to receive the extender;
    an extender clamp configured to couple the extender to the extender loading surface;
    a pressing unit having a first actuator configured to apply mechanical force to bond the quad to the extender;
    a second actuator adapted to actuate the quad clamp; and
    a third actuator adapted to actuate the extender clamp.

2. A mounting device for bonding a quad comprising a plurality of sliders to an extender, the mounting device comprising:
    a quad loading surface configured to receive the quad;
    a quad clamp configured to couple the quad to the quad loading surface;
    an extender loading surface configured to receive the extender;
    an extender clamp configured to couple the extender to the extender loading surface;
    a pressing unit configured to apply mechanical force to bond the quad to the extender; and
    a quad stop, wherein the quad loading surface is disposed between the quad stop and the quad clamp, and wherein the quad stop is separated from the quad loading surface by a recess.

3. A mounting device for bonding a quad comprising a plurality of sliders to an extender, the mounting device comprising:
    a quad loading surface configured to receive the quad;
    a quad clamp configured to couple the quad to the quad loading surface;
    an extender loading surface configured to receive the extender;
    an extender clamp configured to couple the extender to the extender loading surface;
    a pressing unit configured to apply mechanical force to bond the quad to the extender;
    an extender stop, wherein the extender loading surface is disposed between the extender stop and the extender clamp; and
    a backstop configured for aligning the extender, wherein the quad and extender loading surfaces are disposed between the backstop and the pressing unit.

4. A mounting device for bonding a quad comprising a plurality of sliders to an extender, the mounting device comprising:
    a quad loading surface configured to receive the quad;
    a quad clamp configured to couple the quad to the quad loading surface, wherein the quad clamp comprises a contact element configured to rotate as the quad slides along the quad loading surface;
    an extender loading surface configured to receive the extender;
    an extender clamp configured to couple the extender to the extender loading surface; and
    a pressing unit configured to apply mechanical force to bond the quad to the extender.

5. The mounting device of claim 1, wherein a recess is disposed between the quad loading surface and the extender loading surface, wherein the quad loading surface and the extender loading surface extend along a shared plane.

6. A mounting device for bonding a quad comprising a plurality of sliders to an extender, the mounting device comprising:
    a quad loading surface configured to receive the quad;
    a quad clamp configured to couple the quad to the quad loading surface;
    an extender loading surface configured to receive the extender;
    an extender clamp configured to couple the extender to the extender loading surface; and
    a pressing unit configured to apply mechanical force to bond the quad to the extender, wherein the pressing unit is configured to slide along the quad loading surface to push the quad towards a contact surface of the extender.

7. The mounting device of claim 6, wherein the pressing unit is configured to slide the quad along the quad loading surface while the quad clamp maintains pressure on the quad.

8. A system comprising:
    a mounting device for bonding a quad comprising a plurality of sliders to an extender, the mounting device comprising:
        a quad loading surface configured to receive the quad;
        a quad clamp configured to couple the quad to the mounting device;
        an extender loading surface configured to receive the extender;
        an extender clamp configured to couple the extender to the mounting device;
        a pressing unit having a first actuator configured to apply mechanical force to bond the quad to the extender;
        a second actuator adapted to actuate the quad clamp; and
        a third actuator adapted to actuate the extender clamp; and
    a control device comprising one or more switches that control the quad clamp, extender clamp, and the pressing unit.

9. A system comprising:
    a mounting device for bonding a quad comprising a plurality of sliders to an extender, the mounting device comprising:
        a quad loading surface configured to receive the quad;
        a quad clamp configured to couple the quad to the mounting device;
        an extender loading surface configured to receive the extender;
        an extender clamp configured to couple the extender to the mounting device;
        a pressing unit configured to use mechanical force to bond the quad to the extender; and
        a quad stop, wherein the quad loading surface is disposed between the quad stop and the quad clamp, and wherein the quad stop is separated from the quad loading surface by a recess; and
    a control device comprising one or more switches that control the quad clamp, extender clamp, and the pressing unit.

10. A system comprising:
a mounting device for bonding a quad comprising a plurality of sliders to an extender, the mounting device comprising:
- a quad loading surface configured to receive the quad;
- a quad clamp configured to couple the quad to the mounting device;
- an extender loading surface configured to receive the extender;
- an extender clamp configured to couple the extender to the mounting device;
- a pressing unit configured to use mechanical force to bond the quad to the extender;
- an extender stop, wherein the extender loading surface is disposed between the extender stop and the extender clamp; and
- a backstop configured for aligning the extender, wherein the quad and extender loading surfaces are disposed between the backstop and the pressing unit; and a control device comprising one or more switches that control the quad clamp, extender clamp, and the pressing unit.

11. A system comprising:
a mounting device for bonding a quad comprising a plurality of sliders to an extender, the mounting device comprising:
- a quad loading surface configured to receive the quad;
- a quad clamp configured to couple the quad to the mounting device, wherein the quad clamp comprises a contact element configured to rotate as the quad slides along the quad loading surface;
- an extender loading surface configured to receive the extender;
- an extender clamp configured to couple the extender to the mounting device; and
- a pressing unit configured to use mechanical force to bond the quad to the extender; and
- a control device comprising one or more switches that control the quad clamp, extender clamp, and the pressing unit.

12. The system of claim 8, wherein the mounting device further comprises a recess disposed between the quad loading surface and the extender loading surface, wherein the quad loading surface and the extender loading surface extend along a shared plane.

13. A system comprising:
a mounting device for bonding a quad comprising a plurality of sliders to an extender, the mounting device comprising:
- a quad loading surface configured to receive the quad;
- a quad clamp configured to couple the quad to the mounting device;
- an extender loading surface configured to receive the extender;
- an extender clamp configured to couple the extender to the mounting device; and
- a pressing unit configured to use mechanical force to bond the quad to the extender, wherein the pressing unit is configured to slide along the quad loading surface to push the quad towards a contact surface of the extender; and
- a control device comprising one or more switches that control the quad clamp, extender clamp, and the pressing unit.

14. The system of claim 13, wherein the pressing unit is configured to slide the quad along the quad loading surface while the quad clamp maintains pressure on the quad.

* * * * *